United States Patent [19]
Gras et al.

[11] Patent Number: 4,528,355
[45] Date of Patent: Jul. 9, 1985

[54] POWDER VARNISHES BASED ON PARTIALLY BLOCKED ISOPHORONE DIISOCYANATE ISOCYANURATE AND HYDROXYL GROUP CONTAINING POLYESTER, AND METHOD FOR PRODUCING MATTE COATINGS

[75] Inventors: Rainer Gras, Bochum; Heinz Riemer, Bottrop, both of Fed. Rep. of Germany

[73] Assignee: Chemische Werke Hüls Aktiengesellschaft, Marl, Fed. Rep. of Germany

[21] Appl. No.: 627,986

[22] Filed: Jul. 5, 1984

[30] Foreign Application Priority Data

Aug. 4, 1983 [DE] Fed. Rep. of Germany ....... 3328131

[51] Int. Cl.$^3$ .............................................. C08G 18/80
[52] U.S. Cl. ........................................ 528/45; 525/440
[58] Field of Search .......................... 528/45; 525/440

[56] References Cited

U.S. PATENT DOCUMENTS 3,822,240 7/1974 Schmitt et al. ..................... 528/45
4,354,014 10/1982 Wolf et al. ......................... 528/45
4,382,114 5/1983 Höhlein et al. ..................... 528/67

Primary Examiner—Maurice J. Welsh
Attorney, Agent, or Firm—Oblon, Fisher, Spivak, McClelland & Maier

[57] ABSTRACT

A powder coating composition exhibiting good storage stability, having a particle size less than 100 microns and yielding a matte surface after hardening at a temperature of 170° to 220° C., comprising:
a mixture of at least one hydroxyl group containing polyester, at least one isophorone diisocyanate isocyanurate partially blocked with ε-caprolactam having a melting point above 130° C. and a free NCO content between 2 to 8 wt. % and additives.

14 Claims, No Drawings

POWDER VARNISHES BASED ON PARTIALLY BLOCKED ISOPHORONE DIISOCYANATE ISOCYANURATE AND HYDROXYL GROUP CONTAINING POLYESTER, AND METHOD FOR PRODUCING MATTE COATINGS

BACKGROUND OF THE INVENTION

For a long time there has been increasing interest in power coatings which produce a matte surface. The reason for this is primarily a practical one: glossy surfaces require much more cleaning than non-gloss surfaces. Further, for safety reasons and reasons of occupational health, it may be desirable to avoid highly reflective surfaces.

The simplest principle bearing on the production of a matte surface is the incorporation and admixture of a filler into a powder coating to modify the gloss characteristics of the resultant coating. Generally, a filler such as chalk, finely divided silicon dioxide, barium sulfate, and/or an incompatible material such as a wax or cellulose derivative is added in a greater or lesser amount to the varnish depending on the degree of matting effect desired. However, such an admixture has a deleterious effect on the technical properties of the resultant coated film.

At the beginning of the 1970s, the development of powder coating compositions was initiated in which eventually a variation in reactivities was employed to produce a matte effect.

It is known from Dutch Pat. No. 68 06 930 that a matte effect can be produced by hardening an epoxy resin together with sulfamic acid and at least 2% of trimellitic anhydride.

German OS No. 21 47 653 describes a powder coating mixture which yields a matte effect, which mixture is produced by mechanically mixing at least two powder coating compositions, each comprising a different epoxy-resin-and-hardener system with a melting range which differs from that of the other(s).

Further, the process of Ger. OS No. 22 47 779 starts from a mixture of two powder coating compositions which differ from each other with respect to the presence or absence of a hardening accelerator.

Ger. Pat. No. 23 24 696 discloses a process for manufacturing coatings based on epoxy resin(s), said coating yielding matte surfaces. The coatings employ a special hardener, namely the salt of cyclic amidines with particular carboxylic acids. Actually, of the processes mentioned hereinabove, only this process is economically competitive. This is a consequence of the outstanding technical properties of the resulting coating. Meanwhile, the process has undergone improvements (see Ger. OS No. 30 26 455).

The epoxy resin systems disclosed in the prior art are not suitable for producing coatings which have substantial weather stability and light-resistance however. Materials which are particularly suitable for such areas of application are powder coating compositions based on polyesters, and ε-caprolactam-blocked aliphatic polyisocyanates. Thus, e.g., Ger. OS No. 21 05 777 describes powder coating compositions comprised of hydroxyl group containing polyesters and ε-caprolactam-blocked isophorone diisocyanate (IPDI) or adducts of the latter with polyols.

Ger. OS No. 29 29 150 describes powder coating compositions based on hydroxyl group containing polyesters melting between 40° and 120° C., with a proportion of ε-caprolactam-blocked IPDI-adducts. Among the suitable IPDI-adducts proposed in addition to the reaction products with polyols and water is trimerized IPDI, alone or in a mixture with monomeric IPDI. As is evident from the examples of the Ger. OS No. 29 29 150 powder coating compositions hardened by means of ε-caprolactam-blocked IPDI-derivatives always give coatings with glossy surfaces. In light of the difficulties involved in preparing powdered coating compositions of polyesters and blocked polyisocyanates which have a matte appearance, a need continues to exist for such resin compositions which exhibit an improved matte surface.

SUMMARY OF THE INVENTION

Accordingly one object of the present invention is to provide powder coating compositions based on polyesters and containing ε-caprolactam-blocked polyisocyanates, which compositions yield a matte surface upon hardening.

Another object of the invention is to provide a process for producing matte coatings.

Briefly, these objects and other objects of the present invention as hereinafter will become more readily apparent can be attained by a powder coating composition exhibiting good storage stability, having a particle size less than 100 microns and yielding a matte surface after hardening at a temperature of 170° to 220° C., comprising, a mixture of at least one hydroxyl group containing polyester, at least one isophorone diiocyanate isocyanaurate partially blocked with ε-caprolactam having a melting point above 130° C. and a free NCO content between 2 to 8 wt % and additives.

DETAILED DESCRIPTION OF THE PREFERRED EMBODIMENTS

The powder coating composition of the present invention is based upon the combination of at least one polyester with a proportion of ε-caprolactam-blocked IPDI-isocyanurates, and, if necessary or desirable, other additives commonly employed in polymer chemistry. The discovery of the invention is that despite the employment of a partially blocked monomer-free IPDI-isocyanurate having a melting point above 130° C., in particular above 140° C., coatings are still obtained which exhibit good flow properties. In the past the prior art has expressed an upper limit of 120° C. for partially blocked IPDI isocyanurates. (Refer to European OS No. 0 009 694, p.2 line 29 to p.3 line 3). In the present invention the 120° C. melting point limitation is substantially exceeded. It could not be predicted that the powder coating composition of the present invention would yield coatings with matte surfaces.

The hydroxyl group containing polyester component employed according to the present invention is prepared in a known fashion by reacting one or more polycarboxylic acids, their anhydrides, or their methyl esters, with diols and/or polyols, whereby, by suitable choice of the COOH/OH ratio, polyesters with hydroxyl equivalent numbers between 10 and 200, preferably between 20 and 100 mg KOH/g, are obtained.

Suitable cyclic polycarboxylic acid starting materials particularly include the aromatic di- and tricarboxylic acids such as phthalic acid, isophthalic acid, terephthalic acid, 1,3,5-benzenetricarboxylic acid, trimellitic anhydride, dimethyl terephthalate ("DMT"), and the like. Aliphatic polycarboxylic acids of four to fourteen carbon atoms are also useful and may be substituted for the above-mentioned aromatic acids in amounts up to 20 wt.% of the total amount of acids. Examples of such aliphatic acids include adipic acid, 2,2,4- and/or 2,4,4-trimethyladipic acid, sebacic acid, dodecanedicarboxylic acid, and the like.

Suitable diols for the esterification reaction include alkanediols and cycloalkylenediols of two to eight carbon atoms, which in addition may have alkyl group substituents. Examples of such suitable diols include 2,2-dimethyl-1,3-propanediol and 1,4-bis(hydroxymethyl)cyclohexane.

Suitable polyols useful in the esterification reaction include polyols with up to 12 carbon atoms, e.g., glycerol, 1,2,6-hexanetriol, pentaerythritol, 2-ethyl-2-hydroxymethyl-1,3-propanediol, 2-hydroxymethyl-2-methyl-1,3-propanediol, and the like.

The softening temperatures of the polyesters must be low enough so that they may be processed at temperatures of 70° to 120° C. with the additives employed in the production of the coatings.

The partially blocked IPDI-isocyanurate component of the composition is prepared in the customary manner, whereby IPDI is trimerized in the presence of a suitable catalyst system, and the remaining NCO groups are partially blocked with ε-caprolactam. The first reaction step, i.e., the catalytic trimerization, does not yield a uniform product, but rather various oligomers of IPDI which contain at least one isocyanurate ring and at least 3 free NCO groups. In this specification, these products are referred to as "IPDI-isocyanurates" for the sake of simplicity.

The catalyst system comprised of 1,4-diazabicyclo(2.2.2)-octane/1,2-epoxypropane, as described in Ger. OS No. 26 44 684, is particularly suited for the trimerization of IPDI. The trimerization may be carried out with or without inert organic solvents. It is essential that the trimerization reaction be terminated when the NCO content of the mixture reaches a certain level, namely, preferably when 30 to 50% of the NCO groups have reacted in the trimerization reaction. The unreacted IPDI is then separated from the isocyanurate by thin film distillation.

Pure IPDI has an NCO content of 37.8%. The theoretical NCO content of trimerized IPDI is 18.9%; in practice, this is 17 to 18%.

The blocking procedure is itself known (see Ger. OS No. 29 29 150). Advantageously, the blocking reagent ε-caprolactam is added in an amount such that 0.4 to 0.8 equivalents, and preferably 0.5 to 0.7 equivalents, of the NH radical of the ε-caprolactam are employed per equivalent of free NCO.

The polyester and the partially blocked IPDI-isocyanurate employed as a hardener are mixed together in a ratio such that 0.5 to 1.3 equivalents, and preferably 0.9 to 1.1 equivalents, of free and ε-caprolactam-blocked NCO are employed per OH equivalent of the polyester, in the powder coating composition.

A vehicle, ordinarily in the form of a polyacrylate ester, is added in the amount of 0.1 to 1 wt.%, preferably 0.3 to 0.7 wt.%, to the above-described binder combination, these amounts being on the basis of 100 parts by weight of the binder. Additional additives which may be utilized include typical fillers, e.g., micronized chalk (such as DURCAL® 5, supplied by the firm Omya, of Cologne), pigments such as titanium dioxide, and accelerators such as the master batch catalyst described in Example 4.1, infra.

The catalysts added are preferably tin compounds, e.g., di-n-butyltin dilaurate. The amount of catalyst added is 0.01 to 1 wt.% (based on 100 parts by weight of the binder), and preferably 0.1 to 0.5 wt.%.

The inventive powder coating compositions enable coatings to be produced which have matte surfaces.

The degree of deglossing or matting may be also influenced by the fact that the resins and hardeners used have diverse melting points, and the fact that there is a varying amount of free NCO within the composition; and further, by the addition of the above-described catalysts.

The manufacturing process for the powder coating compositions comprises, e.g., pulverizing the individual components (polyesters, blocked IPDI-isocyanurates, and the customary additives employed in powder coating compositions), to the extent that pulverization appears necessary; further, mixing said components, and extruding the mixture at 90° to 130° C., preferably 100° to 120° C.

Once cooled, the extrudate is pulverized to a particle size of below 100 microns. Following the pulverization step, the larger fractions may be removed by screening and returned to the pulverizer.

The powder coating composition may be applied to the substrate to be coated by known application methods, e.g., electrostatic powder-spraying, turbulent vitrification or sintering, electrostatic turbulent vitrification or sintering, and the like. The coated objects are then subjected to hardening for 6 to 35 minutes at temperatures between 170° to 220° C., preferably for 8 to 25 min at temperatures between 180° and 200° C.

Any substrate which can withstand the stated hardening temperatures is suitable for coating with the inventive powder coating compositions; such substrates including metals, glass, ceramics and plastics.

The powder coatings of the present invention have outstanding technical properties.

Having generally described this invention, a further understanding can be obtained by reference to certain specific examples which are provided herein for purposes of illustration only and are not intended to be limiting unless otherwise specified.

1. PREPARATION OF IPDI-ISOCYANURATE

Example 1.1

1000 wt. parts IPDI were heated with 5 wt. parts trimerizing catalyst composed of a mixture of quinuclidine and 1,2-epoxypropane in a weight ratio of 1:2 for 3 hr at 120° C. In the process the NCO content of the addition product decreased to 28% by wt. from 37.8% by wt. To remove IPDI monomer, the reaction mixture was subjected to thin layer distillation at 150° to 160° C. and 0.1 mbar. The product had the following characteristics: NCO content 17.4 wt.%; monomer content less than 0.7 wt.%; and m.p. range 100°–105° C.

2. METHODS OF BLOCKING OF THE IPDI-ISOCYANURATE

Example 2.1

234.4 wt. parts ε-caprolactam were added to 1000 wt. parts IPDI-isocyanurate at 130° to 140° C. in a kneader-type mixer. In order for the reaction to go to completion, it was necessary to maintain the reaction mixture at 130° C. for an additional hour. Product characteristics: free NCO 6.8 wt.%; blocked NCO 7.1 wt.%; m.p. range 133°–141° C.; and vitrification temperature by differential thermal analysis (DTA), 90°–105° C.

Example 2.2

113.7 wt. parts ε-caprolactam were added portionwise at 60°–70° C. to 486.3 wt. parts IPDI-isocyanurate and 0.6 wt. parts di-n-butyltin dilaurate, with the IPDI-isocyanurate and the di-n-butyltin dilaurate dissolved previously in 400 wt. parts anhydrous acetone. The reaction product was then maintained 3 to 5 hr at 70° C., whereupon the solvent was removed by distillation and the residue dried at 80° to 90° C. and 1 mbar. Product characteristics: free NCO 6.6 wt.%; blocked NCO 7.1 wt.%; m.p. range 143°–145° C.; and vitrification temperature (DTA) 98°–115° C.

Example 2.3

304.9 wt. parts ε-caprolactam were reacted with 1000 wt. parts IPDI-isocyanurate by the method of Example 2.1 supra. Product characteristics: free NCO 4.5 wt.%; blocked NCO 8.5 wt.%; m.p. range 138°–148° C.; and vitrification temperature (DTA) 96°–111° C.

Example 2.4

351.7 wt. parts ε-caprolactam were reacted with 1000 wt parts IPDI-isocyanurate by the method of Example 2.1 supra. Product characteristics: free NCO 3.1 wt.%; blocked NCO 9.6 wt.%; m.p. range 140°–150° C.; and vitrification temperature (DTA) 110°–119° C.

Comparison Example A 187.6 wt. parts ε-caprolactam were reacted with 1000 wt parts IPDI-isocyanurate by the method of Example 2.1 supra. Product characteristics: free NCO 8.6 wt.%; blocked NCO 5.9 wt.%; m.p. range 121°–128° C.; and vitrification temperature (DTA) 88°–99° C.

Comparison Example B 469 wt. parts ε-caprolactam were reacted with 1000 wt. parts IPDI-isocyanurate by the method of Example 2.1 supra. Product characteristics: free NCO less than 0.5 wt.%; blocked NCO 11.6 wt.%; m.p. range 145°–160° C.; and vitrification temperature (DTA) 110°–125° C.

3. PREPARATION OF THE POLYESTERS

The initial components (terephthalic acid ("TPA"), dimethyl terephthalate ("DMT"), 1,6-hexanediol ("HD"), 2,2-dimethyl-1,3-propanediol ("neopentyl glycol", "NPG"), 1,4-bis(hydroxymethyl)cyclohexane ("BHC"), and 2-ethyl-2-hydroxymethyl-1,3-propanediol ("trimethylolpropane", "TMP") were charged to a reactor and heated by means of an oil bath. After most of the mass had melted, 0.05 wt.% of di-n-butyltin oxide was added at 160° C. as a catalyst. The first methanol cleavage occurred at about 170° C. In 6 to 8 hr thereafter, the temperature was increased to 220°–230° C., and the reaction was conducted to completion within an additional 12 to 15 hr. The polyester was cooled to 200° C., and liquid fractions were substantially removed within 30 to 45 min by application of a vacuum at 1.3 mbar. During the entire period of reaction, the bottom product was stirred, and N₂ was bubbled gently through the reaction mixture.

Table 1 gives the compositions and corresponding chemical and physical properties of the polyesters prepared.

TABLE 1

Composition and Properties of the Polyesters

| | Relative molar amounts in the polyesters | | |
|---|---|---|---|
| | Example 3.1 | Example 3.2 | Example 3.3 |
| Components of the polyesters | | | |
| TPA | 9 | 10 | 12 |
| DMT | 9 | 10 | 12 |
| HD | 3 | 6.25 | 6.75 |
| NPG | 13 | 10.5 | 11.5 |
| BHC | 3 | 2 | 5 |
| TMP | 1 | 2.9 | 3 |
| Chemical and physical characterizing properties of the polyester | | | |
| OH [equivalent] No. (mg KOH/g) | 50–56 | 55–60 | 56–61 |
| Acid [equivalent] No. (mg KOH/g) | 3–4 | 3–4 | 3–4 |
| Melting point (°C.) | c.70 | c.75 | c.80 |
| Vitrification temperature ([by] DTA, °C.) | c.50 | c.50 | c.55 |
| Viscosity at 160° C. (mPa-sec) | 10,000 | 25,000 | 16,000 |

4. PRODUCTION OF POWDER COATING COMPOSITIONS

General Production Method

The previously pulverized products, namely, the hardener(s), polyester(s), master batch vehicle (for preparation, see infra), and/or master batch catalyst (for preparation, see infra) are mixed with white pigment and fillers, if any such pigments and fillers are used, in an edge mill with intimate mixing, and are then homogenized in an extruder at 100° to 130° C. After cooling, the extrudate is broken up and pulverized in a pinned disk mill to a particle size of less than 100 microns. The powder thus produced is applied with an electrostatic powder-sprayer at 60 kV to a degreased iron plate which may have undergone additional pretreatment. The thus-coated plate is baked in a recirculating-air drying cabinet at temperatures between 180° and 200° C.

PREPARATION OF THE MASTER BATCH OF THE VEHICLE 10 wt.% of the vehicle (a commercial copolymer of butyl acrylate and 2-ethylhexyl acrylate) is homogenized in the melt of the corresponding polyester, and after the mixture sets it is comminuted.

PREPARATION OF THE MASTER BATCH OF THE CATALYST 5 wt.% of the catalyst (di-n-butyltin dilaurate) is homogenized in the melt of the corresponding polyester, and after the mixture sets it is comminuted.

Example 4:1

In accordance with the general production method described above, a powder coating composition with the following formulation was produced, applied, and baked at a temperature between 180° and 200° C.:

407.4 parts by weight of a polyester according to Example 3.1;

142.6 parts by weight of a hardener according to Example 2.1, supra;

400.0 parts by weight of a white pigment (TiO$_2$); and
50.0 parts by weight of master batch vehicle prepared as described above.

Key to the tables hereinafter:
SD = Coating thickness, in microns.
HK = Hardness, in sec, by the method of Koenig (DIN 53 157).
HB = Hardness by the method of Buchholz (DIN 53 153).
ET = Depression, in mm, by the Erichsen test (DIN 53 156).
GS = Rating on grid cutting test (DIN 53 151).
Imp.rev. = Impact reverse, in in-lbs (1 in-lb≅11.52 m-g).
GG 60° < = Gloss, by the method of Gardner (ASTM D 523).

| Baking Conditions | Mechanical Characterizing Parameters | | | | | | |
|---|---|---|---|---|---|---|---|
| Time, Temp., min/°C. | SD | HK | HB | ET | GS | Imp. rev. | GG 60°< |
| 8/200 | 60–75 | 184 | 100 | 4.1–4.8 | 0 | 20 | 55 |
| 10/200 | 70 | 187 | 111 | 5.2–5.5 | 0 | 40 | 57 |
| 12/200 | 70–85 | 188 | 100 | 5.4–5.7 | 0 | 50 | 56 |
| 15/180 | 70–80 | 185 | 111 | 4.1–4.3 | 0 | 20 | 58 |
| 20/180 | 60–80 | 189 | 111 | 4.4–4.9 | 0 | 30 | 57 |
| 25/180 | 75–95 | 190 | 100 | 4.7–5.0 | 0 | 30 | 56 |

Example 4.1

The procedure of this example is analogous to that of Example 4.1, with the following formulation:
405.6 wt. parts of a polyester according to Example 3.2, supra;
144.4 wt. parts of a hardener according to Example 2.1, supra;
400.0 wt. parts of a white pigment (TiO$_2$); and
50.0 wt. parts of master batch vehicle prepared as described above.

| Baking Conditions | Mechanical Characterizing Parameters | | | | | | |
|---|---|---|---|---|---|---|---|
| Time, Temp., min/°C. | SD | HK | HB | ET | GS | Imp. rev. | GG 60°< |
| 8/200 | 70–80 | 178 | 111 | 2.7–3.9 | 0 | 10 | 10 |
| 10/200 | 85 | 180 | 100 | 3.3–4.6 | 0 | 20 | 12 |
| 12/200 | 80–95 | 182 | 111 | 3.6–4.8 | 0 | 30 | 12 |
| 15/180 | 80–90 | 181 | 100 | 2.4–3.5 | 0 | 10 | 13 |
| 20/180 | 70–95 | 180 | 111 | 3.1–4.0 | 0 | 20 | 14 |
| 25/180 | 75–90 | 183 | 111 | 3.8–4.4 | 0 | 30 | 11 |

Example 4.3

The procedure of this example is analogous to that of Example 4.1, with the following formulation:
308.6 wt. parts of a polyester according to Example 3.1, supra;
141.4 wt. parts of a hardener according to Example 2.1, supra;
400.0 wt. parts of a white pigment (TiO$_2$);
50.0 wt. parts of master batch vehicle prepared as described above; and
100.0 wt parts of master batch catalyst prepared as described above.

| Baking Conditions | Mechanical Characterizing Parameters | | | | | | |
|---|---|---|---|---|---|---|---|
| Time, Temp., min/°C. | SD | HK | HB | ET | GS | Imp. rev. | GG 60°< |
| 8/200 | 70–95 | 178 | 111 | 2.9–3.5 | 0 | 10 | 30 |
| 10/200 | 80–95 | 182 | 111 | 3.3–4.1 | 0 | 10 | 32 |
| 12/200 | 90 | 182 | 125 | 3.6–4.4 | 0 | 30 | 32 |
| 15/180 | 70–90 | 184 | 100 | 2.5–2.9 | 0 | <10 | 33 |
| 20/180 | 70–90 | 183 | 111 | 3.4–3.7 | 0 | 20 | 31 |
| 25/180 | 80–95 | 180 | 111 | 4.1–4.4 | 0 | 20 | 34 |

Example 4.4

The procedure of this example is analogous to that of Example 4.1, with the following formulation:
445.5 wt. parts of a polyester according to Example 3.1, supra;
154.4 wt. parts of a hardener according to Example 2.1, supra;
350.0 wt. parts of a white pigment (TiO$_2$); and
50.0 wt. parts of master batch vehicle prepared as described above.

| Baking Conditions | Mechanical Characterizing Parameters | | | | | | |
|---|---|---|---|---|---|---|---|
| Time, Temp., min/°C. | SD | HK | HB | ET | GS | Imp. rev. | GG 60°< |
| 8/200 | 70–90 | 180 | 100 | 5.3–5.7 | 0 | 30 | 60 |
| 10/200 | 60–80 | 183 | 111 | 5.4–5.9 | 0 | 50 | 60 |
| 12/200 | 65–90 | 182 | 111 | 5.8–6.7 | 0 | 50 | 58 |
| 15/180 | 70–80 | 186 | 111 | 4.4–4.9 | 0 | 10 | 57 |
| 20/180 | 70–80 | 184 | 111 | 5.1–5.6 | 0 | 30 | 59 |
| 25/180 | 80–95 | 184 | 111 | 5.7–5.9 | 0 | 40 | 60 |

Example 4.5

The procedure of this example is analogous to that of Example 4.1, with the following formulation:
443.5 wt. parts of a polyester according to Example 3.2, supra;
156.5 wt. parts of a hardener according to Example 2.1, supra;
350.0 wt. parts of a white pigment (TiO$_2$); and
50.0 wt. parts of master batch vehicle prepared as described above.

| Baking Conditions | Mechanical Characterizing Parameters | | | | | | |
|---|---|---|---|---|---|---|---|
| Time, Temp., min/°C. | SD | HK | HB | ET | GS | Imp. rev. | GG 60°< |
| 8/200 | 60–80 | 180 | 100 | 3.0–3.9 | 0 | 10 | 15 |
| 10/200 | 70–80 | 179 | 111 | 3.6–4.7 | 0 | 20 | 18 |
| 12/200 | 70–90 | 184 | 100 | 4.4–5.2 | 0 | 40 | 16 |
| 15/180 | 65–90 | 182 | 111 | 2.8–3.4 | 0 | 10 | 14 |
| 20/180 | 70–80 | 182 | 111 | 3.6–4.0 | 0 | 20 | 14 |
| 25/180 | 70–95 | 184 | 111 | 4.2–4.9 | 0 | 30 | 15 |

Example 4.6

The procedure of this example is analogous to that of Example 4.1, with the following formulation:
404.7 wt. parts of a polyester according to Example 3.3, supra;
145.3 wt. parts of a hardener according to Example 2.1, supra;
400.0 wt. parts of a white pigment (TiO$_2$); and 50.0 wt. parts of master batch vehicle prepared as described above.

| Baking Conditions Time, Temp., min/°C. | Mechanical Characterizing Parameters |  |  |  |  |  |  |
|---|---|---|---|---|---|---|---|
|  | SD | HK | HB | ET | GS | Imp. rev. | GG 60°< |
| 8/200 | 70-90 | 179 | 100 | 4.1-4.9 | 0 | 10 | 30 |
| 10/200 | 60-80 | 181 | 100 | 4.9-5.7 | 0 | 30 | 33 |
| 12/200 | 70-80 | 178 | 111 | 5.4-5.8 | 0 | 50 | 29 |
| 15/180 | 75-95 | 178 | 111 | 3.9-4.4 | 0 | 10 | 32 |
| 20/180 | 70-90 | 180 | 100 | 4.2-4.7 | 0 | 20 | 32 |
| 25/180 | 70-85 | 183 | 111 | 4.6-5.1 | 0 | 50 | 34 |

Example 4.7

The procedure of this example is analogous to that of Example 4.1, with the following formulation:
305.9 wt. parts of a polyester according to Example 3.3, supra;
144.1 wt. parts of a hardener according to Example 2.1, supra;
400.0 wt. parts of a white pigment (TiO$_2$); and
50.0 wt. parts of master batch vehicle prepared as described above; and
100.0 wt. parts of master batch catalyst prepared as described above.

| Baking Conditions Time, Temp., min/°C. | Mechanical Characterizing Parameters |  |  |  |  |  |  |
|---|---|---|---|---|---|---|---|
|  | SD | HK | HB | ET | GS | Imp. rev. | GG 60°< |
| 8/200 | 60-80 | 178 | 100 | 3.7-3.9 | 0 | 10 | 30 |
| 10/200 | 70-90 | 180 | 100 | 3.5-4.4 | 0 | 20 | 32 |
| 12/200 | 70-85 | 179 | 100 | 4.2-4.6 | 0 | 20 | 29 |
| 15/180 | 70-95 | 177 | 100 | 3.2-3.6 | 0 | 20 | 29 |
| 20/180 | 65-85 | 179 | 111 | 3.7-4.0 | 0 | 20 | 32 |
| 25/180 | 70-80 | 178 | 100 | 4.2-4.5 | 0 | 30 | 30 |

Example 4.8

The procedure of this example is analogous to that of Example 4.1, with the following formulation:
405.9 wt. parts of a polyester according to Example 3.1, supra;
144.1 wt. parts of a hardener according to Example 2.2, supra;
400.0 wt. parts of a white pigment (TiO$_2$); and
50.0 wt. parts of master batch vehicle prepared as described above.

| Baking Conditions Time, Temp., min/°C. | Mechanical Characterizing Parameters |  |  |  |  |  |  |
|---|---|---|---|---|---|---|---|
|  | SD | HK | HB | ET | GS | Imp. rev. | GG 60°< |
| 8/200 | 70-90 | 180 | 100 | 3.7-4.0 | 0 | 10 | 51 |
| 10/200 | 70-85 | 182 | 100 | 4.4-4.9 | 0 | 30 | 56 |
| 12/200 | 60-80 | 179 | 111 | 5.1-5.3 | 0 | 40 | 53 |
| 15/180 | 70-80 | 181 | 111 | 3.8-4.0 | 0 | 10 | 52 |
| 20/180 | 60-85 | 181 | 111 | 4.0-4.3 | 0 | 20 | 52 |
| 25/180 | 75-90 | 178 | 125 | 4.4-5.0 | 0 | 30 | 54 |

Example 4.9

The procedure of this example is analogous to that of Example 4.1, with the following formulation:
404 wt. parts of a polyester according to Example 3.2, supra;
146 wt. parts of a hardener according to Example 2.2, supra;
400 wt. parts of a white pigment (TiO$_2$); and
50 wt. parts of master batch vehicle prepared as described above.

| Baking Conditions Time, Temp., min/°C. | Mechanical Characterizing Parameters |  |  |  |  |  |  |
|---|---|---|---|---|---|---|---|
|  | SD | HK | HB | ET | GS | Imp. rev. | GG 60°< |
| 8/200 | 80-95 | 176 | 100 | 2.2-3.1 | 0 | 10 | 9 |
| 10/200 | 80-100 | 178 | 111 | 2.8-3.8 | 0 | 20 | 11 |
| 12/200 | 70-95 | 175 | 111 | 3.7-4.5 | 0 | 20 | 10 |
| 15/180 | 70-80 | 180 | 100 | 2.0-3.0 | 0 | <10 | 12 |
| 20/180 | 70-85 | 177 | 100 | 2.8-3.8 | 0 | 20 | 10 |
| 25/180 | 80-90 | 179 | 111 | 3.4-4.1 | 0 | 20 | 10 |

Example 4.10

The procedure of this example is analogous to that of Example 4.1, with the following formulation:
400.1 wt. parts of a polyester according to Example 3.1, supra;
149.9 wt. parts of a hardener according to Example 2.3, supra;
400.0 wt. parts of a white pigment (TiO$_2$); and
50.0 wt. parts of master batch vehicle prepared as described above.

| Baking Conditions Time, Temp., min/°C. | Mechanical Characterizing Parameters |  |  |  |  |  |  |
|---|---|---|---|---|---|---|---|
|  | SD | HK | HB | ET | GS | Imp. rev. | GG 60°< |
| 8/200 | 70-80 | 180 | 100 | 4.6-5.1 | 0 | 30 | 64 |
| 10/200 | 80 | 183 | 111 | 5.7-6.0 | 0 | 50 | 60 |
| 12/200 | 65-85 | 180 | 100 | 6.1-6.3 | 0 | 60 | 62 |
| 15/180 | 60-75 | 179 | 100 | 4.7-4.9 | 0 | 30 | 63 |
| 20/180 | 70-80 | 184 | 100 | 4.8-5.3 | 0 | 40 | 61 |
| 25/180 | 70-80 | 183 | 111 | 5.4-6.0 | 0 | 60 | 64 |

Example 4.11

The procedure of this example is analogous to that of Example 4.1, with the following formulation:
398.2 wt. parts of a polyester according to Example 3.2, supra;
151.8 wt. parts of a hardener according to Example 2.3, supra;
400.0 wt. parts of a white pigment (TiO$_2$); and
50.0 wt. parts of a master batch vehicle prepared as described above.

| Baking Conditions Time, Temp., min/°C. | Mechanical Characterizing Parameters |  |  |  |  |  |  |
|---|---|---|---|---|---|---|---|
|  | SD | HK | HB | ET | GS | Imp. rev. | GG 60°< |
| 8/200 | 70-80 | 185 | 100 | 3.0-3.9 | 0 | 20 | 25 |
| 10/200 | 60-80 | 187 | 100 | 3.6-4.9 | 0 | 40 | 27 |
| 12/200 | 60-70 | 182 | 100 | 4.1-5.1 | 0 | 50 | 22 |
| 15/180 | 70-80 | 186 | 100 | 2.7-3.8 | 0 | 10 | 24 |
| 20/180 | 70-80 | 180 | 100 | 2.9-3.7 | 0 | 30 | 26 |
| 25/180 | 75 | 183 | 111 | 3.6-4.8 | 0 | 50 | 28 |

Example 4.12

The procedure of this example is analogous to that of Example 4.1, with the following formulation:

397.2 wt. parts of a polyester according to Example 3.3, supra;
152.8 wt. parts of a hardener according to Example 2.3, supra;
400.0 wt. parts of a white pigment (TiO$_2$); and
50.0 wt. parts of master batch vehicle prepared as described above.

| Baking Conditions | Mechanical Characterizing Parameters | | | | | | |
|---|---|---|---|---|---|---|---|
| Time, Temp., min/°C. | SD | HK | HB | ET | GS | Imp. rev. | GG 60°< |
| 8/200 | 60–85 | 180 | 100 | 4.4–5.1 | 0 | 20 | 50 |
| 10/200 | 65–95 | 177 | 100 | 3.9–4.9 | 0 | 40 | 54 |
| 12/200 | 70–95 | 181 | 100 | 5.2–6.0 | 0 | 50 | 53 |
| 15/180 | 80–95 | 176 | 100 | 3.9–4.5 | 0 | 20 | 52 |
| 20/180 | 70–85 | 180 | 100 | 4.2–4.9 | 0 | 40 | 50 |
| 25/180 | 70–90 | 175 | 100 | 4.6–5.7 | 0 | 40 | 55 |

Example 4.13

The procedure of this example is analogous to that of Example 4.1, with the following formulation:
397.4 wt. parts of a polyester according to Example 3.1, supra;
152.6 wt. parts of a hardener according to Example 2.4, supra;
400.0 wt. parts of a white pigment (TiO$_2$); and
50.0 wt. parts of master batch vehicle prepared as described above.

| Baking Conditions | Mechanical Characterizing Parameters | | | | | | |
|---|---|---|---|---|---|---|---|
| Time, Temp., min/°C. | SD | HK | HB | ET | GS | Imp. rev. | GG 60°< |
| 8/200 | 60–70 | 183 | 100 | 5.7–6.8 | 0 | >82 | 72 |
| 10/200 | 60–80 | 180 | 100 | 6.3–7.0 | 0 | 70 | 72 |
| 12/200 | 60–70 | 178 | 100 | 8.3–8.5 | 0 | 70 | 70 |
| 15/180 | 50–70 | 185 | 100 | 6.5–7.7 | 0 | 50 | 70 |
| 20/180 | 60–80 | 188 | 111 | 6.6–7.3 | 0 | 40 | 72 |
| 25/180 | 70 | 184 | 100 | 7.7–8.3 | 0 | 70 | 74 |

Example 4.14

The procedure of this example is analogous to that of Example 4.1, with the following formulation:
395.5 wt. parts of a polyester according to Example 3.2, supra;
154.4 wt. parts of a hardener according to Example 2.4, supra;
400.0 wt. parts of a white pigment (TiO$_2$); and
50.0 wt. parts of master batch vehicle prepared as described above.

| Baking Conditions | Mechanical Characterizing Parameters | | | | | | |
|---|---|---|---|---|---|---|---|
| Time, Temp., min/°C. | SD | HK | HB | ET | GS | Imp. rev. | GG 60°< |
| 8/200 | 70–90 | 179 | 100 | 3.4–4.0 | 0 | 20 | 50 |
| 10/200 | 80–90 | 186 | 111 | 3.6–4.8 | 0 | 40 | 54 |
| 12/200 | 70–80 | 182 | 100 | 4.4–5.5 | 0 | 40 | 53 |
| 15/180 | 60–90 | 180 | 111 | 3.0–3.8 | 0 | 10 | 56 |
| 20/180 | 70–90 | 188 | 111 | 3.4–4.0 | 0 | 40 | 52 |
| 25/180 | 80–95 | 184 | 100 | 3.8–4.8 | 0 | 30 | 54 |

Comparison Example C

The procedure of this example is analogous to that of Example 4.1, with the following formulation:
412 wt. parts of a polyester according to Example 3.1, supra;
138 wt. parts of a hardener according to Comparison Example A, supra;
400 wt. parts of a white pigment (TiO$_2$); and
50 wt. parts of master batch vehicle prepared as described above.

| Baking Conditions | Mechanical Characterizing Parameters | | | | | | |
|---|---|---|---|---|---|---|---|
| Time, Temp., min/°C. | SD | HK | HB | ET | GS | Imp. rev. | GG 60°< |
| 8/200 | 70–90 | 120 | 91 | 1.1–2.2 | 0 | <10 | 5 |
| 10/200 | 80 | 118 | 100 | 1.4–2.4 | 0 | <10 | 2 |
| 12/200 | 80 | 150 | 100 | 2.2–2.5 | 0 | 10 | 4 |
| 15/180 | 70–90 | 130 | 100 | 0.8–1.7 | 0 | <10 | 6 |
| 20/180 | 60–90 | 131 | 91 | 1.2–1.9 | 0 | <10 | 1 |
| 25/180 | 75–95 | 126 | 100 | 0.8–2.1 | 0 | 10 | 4 |

Comparison Example D

The procedure of this example is analogous to that of Example 4.1, with the following formulation:
386.9 wt. parts of a polyester according to Example 3.1, supra;
161.3 wt. parts of a hardener according to Comparison Example B, supra;
400.0 wt. parts of a white pigment (TiO$_2$); and
50.0 wt. parts of master batch vehicle prepared as described above.

| Baking Conditions | Mechanical Characterizing Parameters | | | | | | |
|---|---|---|---|---|---|---|---|
| Time, Temp., min/°C. | SD | HK | HB | ET | GS | Imp. rev. | GG 60°< |
| 8/200 | 60–80 | 190 | 111 | 5.8–8.3 | 0 | 20 | 75 |
| 10/200 | 70–90 | 195 | 111 | 7.5–9.1 | 0 | 50 | 79 |
| 12/200 | 65–85 | 193 | 111 | 7.2–8.9 | 0 | 40 | 76 |
| 15/180 | 70–90 | 192 | 111 | 4.9–6.1 | 0 | 30 | 80 |
| 20/180 | 60–80 | 196 | 100 | 5.7–7.2 | 0 | 20 | 79 |
| 25/180 | 70–85 | 191 | 111 | 6.4–8.1 | 0 | 50 | 82 |

Comparison Example E

The procedure of this example is analogous to that of Example 4.1, with the following formulation:
420 wt. parts of Polyester 3353 (manufacturer Chemische Werke Huels AG, of Marl, FRG);
130 wt. parts of Hardener B 1530 (manufacturer the firm Omya, of Cologne, FRG);
200 wt. parts of a white pigment (TiO$_2$); and
50 wt. parts of master batch vehicle prepared as described above; and
200 wt. parts of DURCAL®5 ([micronized chalk,] manufacturer the firm Omya, of Cologne, FRG).

| Baking Conditions | Mechanical Characterizing Parameters | | | | | | |
|---|---|---|---|---|---|---|---|
| Time, Temp., min/°C. | SD | HK | HB | ET | GS | Imp. rev. | GG 60°< |
| 8/200 | 60–80 | 180 | 100 | 6.4–6.8 | 0 | 20 | 56 |
| 10/200 | 70–90 | 178 | 111 | 6.9–7.2 | 0 | 40 | 58 |
| 12/200 | 60–70 | 182 | 111 | 7.0–7.5 | 0 | 70 | 57 |
| 15/180 | 70–80 | 179 | 100 | 6.2–6.6 | 0 | 30 | 55 |

-continued

| Baking Conditions Time, Temp., min/°C. | Mechanical Characterizing Parameters | | | | | | |
|---|---|---|---|---|---|---|---|
| | SD | HK | HB | ET | GS | Imp. rev. | GG 60°< |
| 20/180 | 80 | 176 | 111 | 6.8-7.1 | 0 | 50 | 59 |
| 25/180 | 60-80 | 181 | 100 | 6.8-7.7 | 0 | 50 | 57 |

Comparison Example F

The procedure of this example is analogous to that of Example 4.1, with the following formulation:
420 wt. parts of Polyester 3353 (manufacturer Chemische Werke Huels AG, or Marl, FRG);
130 wt. parts of Hardener B 1530 (manufacturer the firm Omya, of Cologne, FRG);
150 wt. parts of a white pigment (TiO$_2$); and
50 wt. parts of master batch vehicle prepared as described above; and
250 wt. parts of DURCAL®5 ([micronized chalk,] manufacturer the firm Omya, of Cologne, FRG).

| Baking Conditions Time, Temp., min/°C. | Mechanical Characterizing Parameters | | | | | | |
|---|---|---|---|---|---|---|---|
| | SD | HK | HB | ET | GS | Imp. rev. | GG 60°< |
| 8/200 | 70-80 | 182 | 100 | 6.2-6.5 | 0 | 10 | 44 |
| 10/200 | 60-70 | 178 | 111 | 6.4-7.0 | 0 | 30 | 46 |
| 12/200 | 60-70 | 181 | 111 | 6.7-7.2 | 0 | 50 | 43 |
| 15/180 | 70-85 | 181 | 100 | 5.9-6.2 | 0 | 10 | 45 |
| 20/180 | 80 | 177 | 111 | 6.0-6.7 | 0 | 20 | 45 |
| 25/180 | 70-80 | 182 | 111 | 6.4-7.0 | 0 | 40 | 46 |

Having now fully described this invention, it will be apparent to one of ordinary skill in the art that many changes and modifications can be made thereto without departing from the spirit or scope of the invention as set forth herein.

What is claimed as new and is intended to be secured by Letters Patent is:

1. A powder coating composition exhibiting good storage stability, having a particle size less than 100 microns and yielding a matte surface after hardening at a temperature of 170° to 220° C., comprising:
   a mixture of at least one hydroxyl group containing polyester, at least one isophorone diisocyanate isocyanurate partially blocked with ε-caprolactam having a melting point above 130° C. and a free NCO content between 2 to 8 wt. % and additives.

2. The composition of claim 1, wherein the free NCO content of said blocked isocyanurate is 3 to 7 wt.%.

3. The composition of claim 1, wherein said partially blocked isophorone isocyanurate is prepared by reacting IPDI-isocyanurate with ε-caprolactam in amounts such that the NCO/NH ratio of the reactants is 1:X, wherein $0.4 < X < 0.9$.

4. The composition of claim 3, wherein the value of X is within the range of $0.5 < X < 0.8$.

5. The composition of claim 1, wherein the polyester component is the reaction product of terephthalic acid and/or dimethyl terephthalate with 1,6-hexanediol, 2,2-dimethyl-1,3-propanediol, 1,4-bis(hydroxymethyl)-cyclohexane or 2-ethyl-2-hydroxymethyl-1,3-propanediol.

6. The composition of claim 1, wherein said polyester component has a hydroxyl equivalent number between 10 and 200 (in mg KOH/g).

7. The composition of claim 6, wherein said equivalent number ranges between 20 and 100.

8. The composition of claim 1, wherein the polyester and blocked isocyanurate reactants are reacted in quantities such that the OH to NCO ratio is X:1, where $0.8 < X < 1.2$.

9. The composition of claim 8, wherein the OH to NCO ratio is X:1, where $0.9 < X < 1.1$.

10. The composition of claim 1, which further comprises di-n-butyltin dilaurate as the catalyst in an amount of 0.01 to 1 wt.% based on 100 parts by weight of the binder.

11. The composition of claim 10, wherein the amount of said catalyst ranges from 0.1 to 0.6 wt.%.

12. A process for producing a coating having a matte appearance, comprising:
   extruding the powder composition of claim 1 from an extruder at a temperature of 90° to 130° C. onto a substrate; and
   hardening the coating at a temperature within the range of 170° to 220° C. for 6 to 35 min.

13. The method of claim 12, wherein the temperature of extrusion is 100° to 120° C.

14. The method of claim 12, wherein the temperature of the hardening step ranges between 180° and 200° C. over a time of 8 to 25 min.

* * * * *